(12) United States Patent
Chiapuzzi

(10) Patent No.: US 8,096,194 B2
(45) Date of Patent: Jan. 17, 2012

(54) TRANSDUCER FOR MEASURING PRELOAD AND TORQUE OF A SCREW AND APPARATUS THEREWITH

(75) Inventor: Angelo Chiapuzzi, Milan (IT)

(73) Assignee: Atlas COPCO BLM S.r.l., Paderno Dugnano, Milan (IT)

( * ) Notice: Subject to any disclaimer, the term of this patent is extended or adjusted under 35 U.S.C. 154(b) by 14 days.

(21) Appl. No.: 12/451,923

(22) PCT Filed: Jun. 12, 2008

(86) PCT No.: PCT/EP2008/004717
§ 371 (c)(1),
(2), (4) Date: Mar. 3, 2010

(87) PCT Pub. No.: WO2008/151799
PCT Pub. Date: Dec. 18, 2008

(65) Prior Publication Data
US 2010/0162829 A1 Jul. 1, 2010

(30) Foreign Application Priority Data
Jun. 13, 2007 (IT) .............................. MI2007A1195

(51) Int. Cl.
*B25B 23/14* (2006.01)
(52) U.S. Cl. ...................................... 73/862.21; 73/761

(58) Field of Classification Search ............ 73/760–761, 73/862.21–862.22
See application file for complete search history.

(56) References Cited

U.S. PATENT DOCUMENTS

| 4,574,328 A | * | 3/1986 | Maier | 361/284 |
| 5,456,121 A | * | 10/1995 | Lew et al. | 73/861.72 |
| 2003/0146748 A1 | * | 8/2003 | Duncan et al. | 324/244.1 |

FOREIGN PATENT DOCUMENTS

| DE | 1 277 585 B | 9/1968 |
| DE | 34 98 310 A1 | 10/1984 |
| FR | 1 519 874 A | 4/1968 |

OTHER PUBLICATIONS

PCT Search Report dated Sep. 19, 2008.

* cited by examiner

*Primary Examiner* — Max Noori
(74) *Attorney, Agent, or Firm* — Hedman & Costigan, P.C.; James V. Costigan

(57) ABSTRACT

A measuring apparatus (10) comprises a transducer (11) for measuring preload and torque of a screw. The transducer in turn comprises a first and second sensor element formed by two axially spaced annular zones (16, 17) of a hollow body (15) which are provided with respective load-cell sensors (18, 19). The two zones are separated by an annular zone (20) of the hollow body with a wall with a greater thickness and in which internally there is provided a non-rotating coupling seat (21) with the threaded-hole element (22) in a part of which the screw is tightened.

14 Claims, 1 Drawing Sheet

TRANSDUCER FOR MEASURING PRELOAD AND TORQUE OF A SCREW AND APPARATUS THEREWITH

Figure 1:
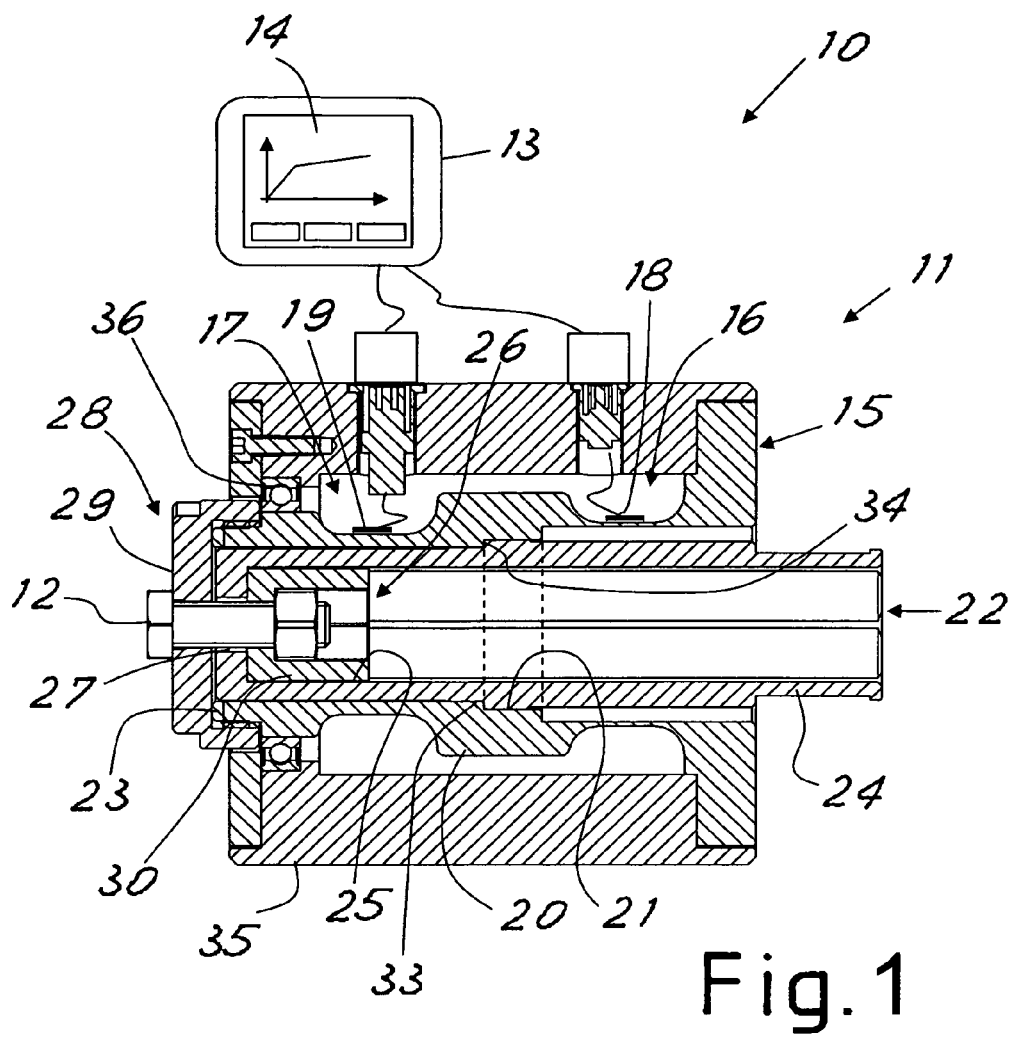

The present invention relates to a transducer for measuring the preload and tightening torque of a screw and, also, to an apparatus with such a transducer for calculating the features of the screw being tested, such as the friction coefficient.

When tightening a bolt, the preload depends not only on the torque applied but also on the friction coefficient of the screw, which in turn depends on various factors such as the type of surface treatment, the presence of lubricants, geometrical errors, etc. It is thus indispensable to be able to dispose of a transducer that during a tightening test enables the various tightening features and, in particular, the friction coefficient, to be measured.

In the prior art, apparatuses have been proposed for carrying out this measurement. They comprise in general load cells that measure the torque and forces produced on a suitable structure into which the screw subjected to testing is screwed. The problem, however, is to make a structure that enables an extended range of screws and of corresponding nuts to be tested with reliability and precision. The screws in particular may not only be of various diameters but also of various lengths.

In order to meet the requirements for flexibility in the type, length and diameter of screws that are testable with the same apparatus, transducers have been proposed that are formed of a body consisting of two cylindrical sensor elements coaxially inserted into one another. Such a type of transducer is disclosed in U.S. Pat. No. 5,339,696.

The cylindrical elements are machined to form two toroidal cavities with two thin side walls to which suitable load cells are fitted. The screw to be subjected to a test axially traverses the most internal element and is tightened between the two ends thereof with the corresponding nut. If the screw is too short to do so, an adapter is used that takes the nut inside and is rested on the end of the inner element that is not reachable by the screw. The structure of such a transducer is, however, very complicated and difficult to make, having toroidal cavities that are substantially closed and containing the load cells. As each wall provided with load cells has to be connected to only one end, the toroidal cavities are opened through slits on opposite ends of the body of the transducer and to avoid dirt entering, such slits are closed by a suitable washer that causes disturbances to torque measuring. Substantially, the transducer that is thus made is excessively expensive, difficult to make, delicate and of unsatisfactory precision.

The general object of the present invention is to overcome the aforesaid drawbacks by providing a precise transducer, and a measuring apparatus with this transducer, that is easier to make, of reasonable cost and of certain reliability.

In view of this object it has been decided to devise, according to the invention, a transducer for measuring preload and torque of a screw comprising a first cylindrical sensor element and a second cylindrical sensor element that are connected together and an element with a threaded hole for screwing the screw to be subjected to measuring, the two sensor elements being arranged for measuring respectively torque applied to the head of the screw and the pull between the screw and the element with a threaded hole, characterized in that the first and second sensor element comprise two annular zones of a hollow body spaced apart axially, the two zones having a wall with reduced thickness with respective torque and force load-cell sensors and being separated from an annular zone of the hollow body with a wall with a greater thickness and in which internally there is provided a non-rotating coupling seat with the threaded-hole element in a part of which the screw is tightened that is introduced axially through an end of the hollow body.

Also an apparatus with such a transducer is claimed.

Figure 2:
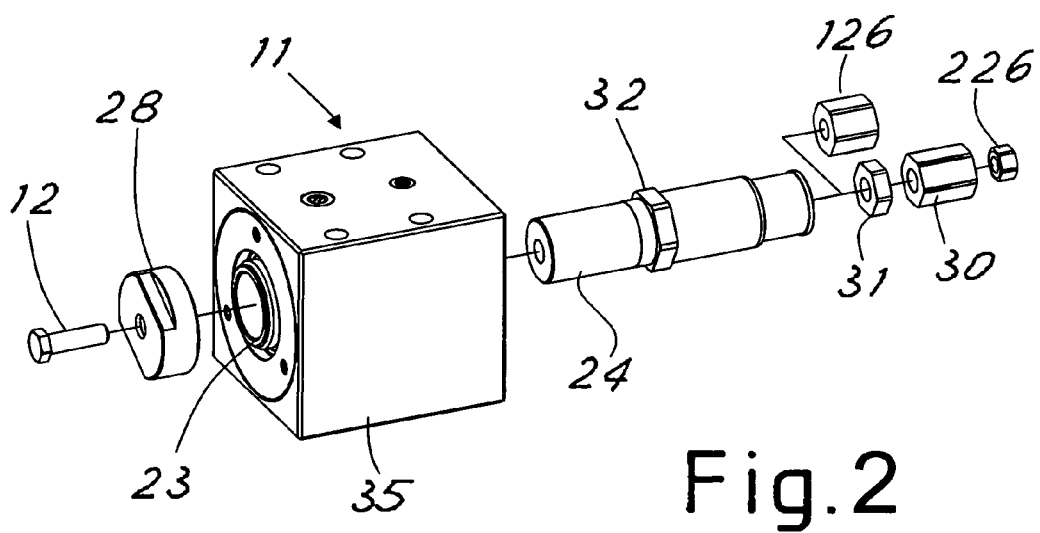

In order to make clearer the explanation of the innovative principles of the present invention and the advantages thereof over the prior art, with the help of the attached drawings, there will be disclosed below a possible embodiment by way of non-limiting example of such principles. In the drawings:

FIG. 1 is a schematic view of an apparatus according to the invention with a longitudinal section of the transducer, FIG. 2 is a perspective exploded view of the transducer in FIG. 1.

With reference to the figures, in FIG. 1 there is shown an apparatus, generally indicated by 10, for obtaining features of a screw being tested. The apparatus comprises a load-cell transducer 11 into which the screw being tested is screwed (indicated by 12) and a processing unit 13 that receives measuring signals from the load cells of the transducer and runs suitable processing for calculating therefrom the features, which are then advantageously displayed on a display 14. The processing unit may be a suitably programmed microprocessor unit that is programmed in a per se known manner. Advantageously, it may be an industrial PC with a suitable programme and touchscreen display.

The measuring transducer 11 comprises a hollow body 15 (advantageously generally cylindrical) with two annular zones 16 and 17 spaced apart axially. The two zones have a wall with a lesser thickness than the rest of the hollow body. In particular, the zones have a lesser thickness than a quantity that is suitable for withstanding the operating torque values set for the transducer, providing at the same time suitable elastic deformability for detecting the forces and/or torque by means of the respective load-cell sensors 18, 19.

The two zones 16 and 17 are separated by an intermediate annular zone 20 of the hollow body that has a wall of greater thickness than the measuring zones 16, 17 that make the sensor elements of the transducer. The greater thickness is such as to have the zone 20 substantially stiff for the operating torque set for the transducer.

In the intermediate zone 20 there is provided internally a non-rotating coupling seat 21 with a threaded-hole element 22 into which the screw 12 is tightened that is introduced axially through an end 23 of the hollow body to react between the aforesaid end and the seat 21. The sensor element formed by the zone 16 and by the respective load cell 18 is a torque transducer that measures the total torque applied to the head of the screw from the outside (for example by a normal tightening wrench), whilst the sensor element formed by the zone 17 (with a thicker wall) and by the respective suitable load cell 19 is a force transducer and measures the preload obtained by tightening the screw at a certain torque setting.

As easily imaginable by those skilled in the art, such torque and preload measurements enable the desired tightening parameters to be obtained, such as the friction coefficient using the known formulas (for example as specified by standard EN ISO 16047).

Advantageously, the hollow body is made substantially cylindrical and as a monobloc, advantageously machined, with an external reduction of diameter at the two zones with reduced wall thickness.

In order to protect the measuring system of the transducer, the hollow body 15 is advantageously received in an outer enclosure 35 from which the ends thereof face one another. The end of the hollow body opposite the screw introduction end is stiffly connected to the enclosure (in turn locked, for example, on a test bench) whilst the opposite end 23 is advantageously supported on the outer enclosure by means of a bearing 36 in order not to hinder the measuring of the applied torque.

Advantageously, the hollow body has an end 23 from which the screw is inserted that supports a replaceable ring nut 28 that is traversed by the screw and creates a resting surface 29 for the head of the screw. Ring nuts can thus be chosen that are made of material and/or have resting shapes that are different according to the screw to be tested.

The threaded-hole element 22 can be simple nut for the screw to be tested, but advantageously, it is made here in a more complex shape to provide greater adaptability to the transducer.

In particular, as can be seen well in FIG. 1 and in FIG. 2, the threaded-hole element 22 comprises an adapter 24 with a tubular body having on the external periphery a coupling 32 that is complementary to the coupling seat 21 inside the hollow measuring body. Advantageously, the seat 21 and coupling 32 are made hexagonal. The rest of the adapter does not touch the walls of the hollow body at the measuring elements in order not to disturb the measurements.

As can be seen in FIG. 1, the adapter 24 has an internal seat 25 inside the screw introduction end for receiving a nut 26 with a threaded hole for screwing-in the screw being tested. The seat 25 has a bottom bounded by the closed end of the adapter, which is traversed axially by a hole 27 for the free passage of the screw.

In this way, it is not necessary for the screw to be long enough to reach the zone 20 between the measuring elements but the adapter 24 is sufficiently stiff to return the stress on the screw as far as this zone. The screw thus always acts on the two opposite ends of the zone 17.

The adapter 24 is inserted into the hollow body from an end of the hollow body opposite the end 23 from which the screw is inserted. The complementary coupling 32 and the coupling seat 21 have advantageously reciprocal arrest surfaces 33, 34 for arresting further axial sliding of the adapter beyond the coupling position in which the complementary coupling is inserted into said coupling seat. Such surfaces are made advantageously by suitable radial steps.

In this way the traction of the screw does not move the adapter further to the end 23.

In order to obtain easily the step arresting surface and the coupling seat, the hollow body is made with an inside diameter between the seat 21 and the screw introduction end 23, which is less than the inside diameter between the seat 21 and the other end. This second diameter is also greater than that of the seat 21.

The nut 26 can be suitably made with an outer dimension suitable for being coupled directly on the inner walls of the adapter 24. This is shown, for example, by 126 in FIG. 2.

In order to enable the screw-nut coupling to be measured, with nuts of differing outside diameter a further replaceable adapter 30 is advantageously provided that is arranged between the internal seat 25 and the nut with a threaded hole (indicated by 226 in FIG. 2) to adapt the respective diameters thereof with impedance of mutual rotation. A plurality of adapters can thus be provided for all the types of nut that it is intended to use. The further adapter 30 may have an axial length that differs according to the length of the screw to be tested.

In order to provide a further adaptation to the length of the screw, a replaceable spacer 31 (shown in FIG. 2) is also advantageously provided that is arranged on the bottom of the seat 25 to be traversed by the screw and to adapt the position of the nut (or of the adapter 30) along the axis of the screw. A plurality of spacers can thus be provided for all the lengths of screws that it is intended to use.

To summarize, with the disclosed structure the force transducer 17, 19 measures the preload that is obtained by tightening the screw at a certain torque, like the pull between the head of the screw, resting on the lockscrew 28, and the nut 26, by resting 34 on the sleeve 22. The torque transducer 16, 18 on the other hand, measures the total torque applied to the head of the screw, adding the torque due to friction below the head (which passes via the lockscrew 28 through the zone 17 to reach the zone 16) and the torque due to the friction of the threads, which is transmitted to the transducer 16 due to the hexagonal couplings of the nut 26 and of the rest 34. The load cell 19 is not affected by the transmitted torque. In fact, the strain gauges that measure the compression force are not very sensitive to torque and, in the case in point, a max. error of 0.7% maximum torque occurs. As this error is a linear function, it can easily be corrected by the measurements display software.

It is now clear how the set objects have been reached, by providing a transducer and a measuring apparatus with a simple and tough structure and great adaptability.

Naturally, the above description of an embodiment applying the innovative principles of the present invention is provided only by way of example of such innovative principles and must not therefore be taken to limit the protective scope of what is claimed herein. For example, the measurements and proportions of the various parts of the transducer may vary according to specific practical needs, such as, for example, the range of screws that it is desired to be able to test with the same transducer. The adapting elements such as the ring nuts 28, the spacers 31 and the diameter adapters 30, and the special nuts 126, can be of any number of different models according to, for example, the number of screws and/or of nuts of different size it is desired to be able to test with the same transducer.

The invention claimed is:

1. Transducer for measuring preload and torque of a screw, comprising a first cylindrical sensor element and a second cylindrical sensor element that are connected together and to an element with a threaded hole for tightening the screw to be subjected to measuring, the two sensor elements being arranged for measuring respectively torque applied to a head of the screw and a pull between the screw and the element with a threaded hole, characterized in that the transducer comprises a hollow body made as a monobloc with two annular measuring zones which are spaced apart axially and form part of said first and second sensor elements the two annular measuring zones of said hollow body having a wall with reduced thickness with respective torque and force load-cell sensors and being separated from an intermediate annular zone of the hollow body which has a wall with a greater thickness than the annular measuring zones where said greater thickness makes said intermediate annular zone substantially stiff for the operating torque of the transducer and in said hollow body there is internally provided a seat for non-rotating coupling with the threaded-hole element in a part of which the screw introduced axially through an end of the hollow body is tightened.

2. Transducer according to claim 1, characterized in that the threaded-hole element comprises an adapter with a tubular body having on the external periphery a complementary coupling for the coupling seat and an internal seat for receiving a nut with a threaded hole for tightening the screw.

3. Transducer according to claim 1, characterized in that the coupling seat has a hexagonal section.

4. Transducer according to claim 2, characterized in that there is provided a further replaceable adapter that is arranged between said internal seat and the nut with a threaded hole to adapt the respective diameters thereof with impedance of mutual rotation.

5. Transducer according to claim 2, characterized in that there is provided a replaceable spacer that is arranged on the bottom of said internal seat to be traversed by the screw and adapt the position of the nut along the axis of the screw.

6. Transducer according to claim 2, characterized in that the adapter is inserted into the hollow body from an end of the hollow body opposite the end of the hollow body from which the screw is inserted.

7. Transducer according to claim 6, characterized in that the complementary coupling and the coupling seat have arresting surfaces for arresting further axial sliding of the adapter beyond the coupling position in which the complementary coupling is received in said coupling seat.

8. Transducer according to claim 1, characterized in that the hollow body is in turn received in an outer enclosure (35), with an end of the hollow body from which the screw is inserted that is supported on the outer enclosure by means of a bearing and an opposite end of the hollow body that is stiffly connected to said outer enclosure.

9. Transducer according to claim 1, characterized in that the hollow body has an end from which the screw is inserted that supports a replaceable ring nut that is traversed by the screw and defines a resting surface for the head of the screw.

10. Transducer according to claim 2, characterized in that the adapter has a tubular body with a hexagonal internal section.

11. Transducer according to claim 1, characterized in that the hollow body is substantially cylindrical with at least an external reduction of diameter at the two zones with reduced wall thickness.

12. Transducer according to claim 11, characterized in that the hollow body has an inside diameter between the seat and the screw introduction end that is less than the inside diameter between the seat and the other end.

13. Apparatus for determining the preload and tightening torque of a screw, comprising a load-cell transducer, into which the screw being tested is screwed, and a processing unit that receives measuring signals from the load cells of the transducer and processes such signals to calculate therefrom the preload and tightening torque of a screw, characterized in that the transducer is made according to claim 1.

14. Apparatus according to claim 13, characterized in that it comprises a display displaying the obtained features.

\* \* \* \* \*